(12) United States Patent
Adkins et al.

(10) Patent No.: US 8,165,918 B2
(45) Date of Patent: Apr. 24, 2012

(54) METHOD OF LICENSING FUNCTIONALITY AFTER INITIAL TRANSACTION

(75) Inventors: Christopher Alan Adkins, Lexington, KY (US); Timothy P. Craig, Georgetown, KY (US); Stephen Kelly Cunnagin, Lexington, KY (US); Timothy Lowell Strunk, Lexington, KY (US); Michael Shayne Wilson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 91 days.

(21) Appl. No.: 12/348,223

(22) Filed: Jan. 2, 2009

(65) Prior Publication Data

US 2009/0112731 A1    Apr. 30, 2009

Related U.S. Application Data

(60) Division of application No. 11/562,031, filed on Nov. 21, 2006, which is a continuation of application No. 10/335,767, filed on Jan. 31, 2003.

(51) Int. Cl.
*G06Q 30/00* (2012.01)

(52) U.S. Cl. .............. 705/26; 705/64; 705/67; 713/180; 713/194

(58) Field of Classification Search ............. 705/26, 705/64; 713/180, 194
See application file for complete search history.

(56) References Cited

U.S. PATENT DOCUMENTS

| | | | |
|---|---|---|---|
| 6,611,812 B2 * | 8/2003 | Hurtado et al. | 705/26 |
| 6,857,067 B2 * | 2/2005 | Edelman | 713/155 |
| 7,536,553 B2 * | 5/2009 | Auslander et al. | 713/176 |
| 2004/0030564 A1 * | 2/2004 | Hartinger et al. | 705/1 |
| 2008/0300899 A1 * | 12/2008 | Brown et al. | 705/1 |

* cited by examiner

*Primary Examiner* — Pierre E Elisca (57) ABSTRACT

Methods for licensing functionality after an initial transaction are provided. One such method is directed to licensing after an initial transaction of a customer obtaining a supply item including the step of prompting the customer to acquire a usage license for the supply item.

15 Claims, 9 Drawing Sheets

METHOD OF LICENSING FUNCTIONALITY AFTER INITIAL TRANSACTION

CROSS REFERENCE TO RELATED APPLICATIONS

This is a divisional of U.S. patent application Ser. No. 11/562,031 filed Nov. 21, 2006, entitled "METHOD OF LICENSING FUNCTIONALITY AFTER INITIAL TRANSACTION," which is a continuation of U.S. patent application Ser. No. 10/355,767 filed Jan. 31, 2003.

BACKGROUND OF THE INVENTION

1. Field of the Invention

The present invention relates to imaging, and, more particularly, to a method of licensing functionality after an initial transaction.

2. Description of the Related Art

Imaging apparatus, such as ink jet printers and/or copiers, electrophotographic printers and/or copiers, and multifunction devices, have long been available to customers. Such imaging apparatus require a supply item, such as an ink jet printhead cartridge, ink tank, or toner cartridge, that provides a source of imaging substance, such as ink or toner. Traditionally, a customer purchased an imaging apparatus or supply item through an initial transaction realizing that the functionality, i.e., features, associated with the imaging apparatus or supply item was fixed. For example, when the supply of ink of an ink jet printhead cartridge was depleted, the customer would simply obtain a new cartridge at a retail outlet. Likewise, if a customer required additional imaging functionality, e.g., additional printing modes, higher resolution or higher printing speed, beyond that of the customer's current imaging apparatus, the customer had no choice but to purchase a new imaging apparatus that included the additional functionality.

What is needed in the art is a method of licensing functionality after an initial transaction.

SUMMARY OF THE INVENTION

The present invention provides a method of licensing functionality after an initial transaction.

The invention, in one form thereof, includes the method steps of determining whether an initial licensed amount of an imaging substance in a supply item has been depleted, the supply item being subject to a usage license; informing a customer of the depletion of the imaging substance in the supply item; querying whether the customer would like to renew the supply item; and if the customer chooses to renew the supply item, the method further comprising the steps of the customer purchasing a new license to renew the supply item; and the customer receiving a new digital signature for the supply item.

In another form thereof, the invention is directed to a method of performing an e-commerce transaction through a communications link between an e-commerce server and a customer. The method includes the steps of initiating communications between the customer and the e-commerce server regarding a renewal of a supply item; the customer supplying to the e-commerce server predetermined information necessary to generate a digital signature for the supply item; the customer submitting a license fee to acquire a license to complete the renewal of the supply item; and the e-commerce server supplying the digital signature for the supply item.

In yet another form thereof, the invention is directed to a method for performing a commerce transaction involving a remanufacturer and a customer. The method includes the steps of the remanufacturer securing a capability to create digital signatures for supply items; submitting a supply item to the remanufacturer to receive a new digital signature; the customer submitting a fee to the remanufacturer; and the remanufacturer supplying a digital signature for the supply item.

In still another form thereof, the invention is directed to a method for licensing after an initial transaction of a customer obtaining a supply item. The method includes the step of prompting the customer to acquire a usage license for the supply item.

In still another form thereof, the invention is directed to a method for licensing extra functionality after an initial transaction including the steps of a customer purchasing a multi-pack of supply items and a license to use a first supply item of the supply items of the multi-pack; determining whether an imaging substance in the first supply item has been depleted; wherein if the first supply item is depleted, then performing the further steps of prompting the customer to install a second supply item from the multi-pack, and prompting the customer to acquire a new license for the second supply item.

In still another form thereof, the invention is directed to a method for licensing extra functionality after an initial transaction. The method includes the steps of providing an e-commerce server for communicating with a customer; monitoring usage of a first supply item; determining whether the first supply item is near empty; notifying a manufacturer that the first supply item is near empty by initiating a communication with the e-commerce server; and the manufacturer responding to the notifying by sending a new supply item to the customer.

In still another form thereof, the invention is directed to a method for licensing extra functionality after an initial transaction, including the steps of providing a device with a predetermined range "A" to "N" of imaging features, wherein "A" represents minimum available features for the device and "N" represents maximum available features for the device; providing to a customer an available feature list for selection of desired features for the device; the customer making the selection of the desired features for the device and communicating the selection to a manufacturer of the device; and the manufacturer enabling the desired features selected for the device.

An advantage of the present invention is that licensing and/or feature selections are made to be convenient for the customer.

Another advantage is that, in some embodiments of the invention, the customer can customize the imaging apparatus and/or supply item to correspond to the customer's imaging needs or desires.

Yet another advantage is that, in some embodiments of the invention, the customer can upgrade the functionality of their current imaging apparatus and/or supply item without having to purchase a new imaging apparatus and/or supply item.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE INVENTION

Figure 1:
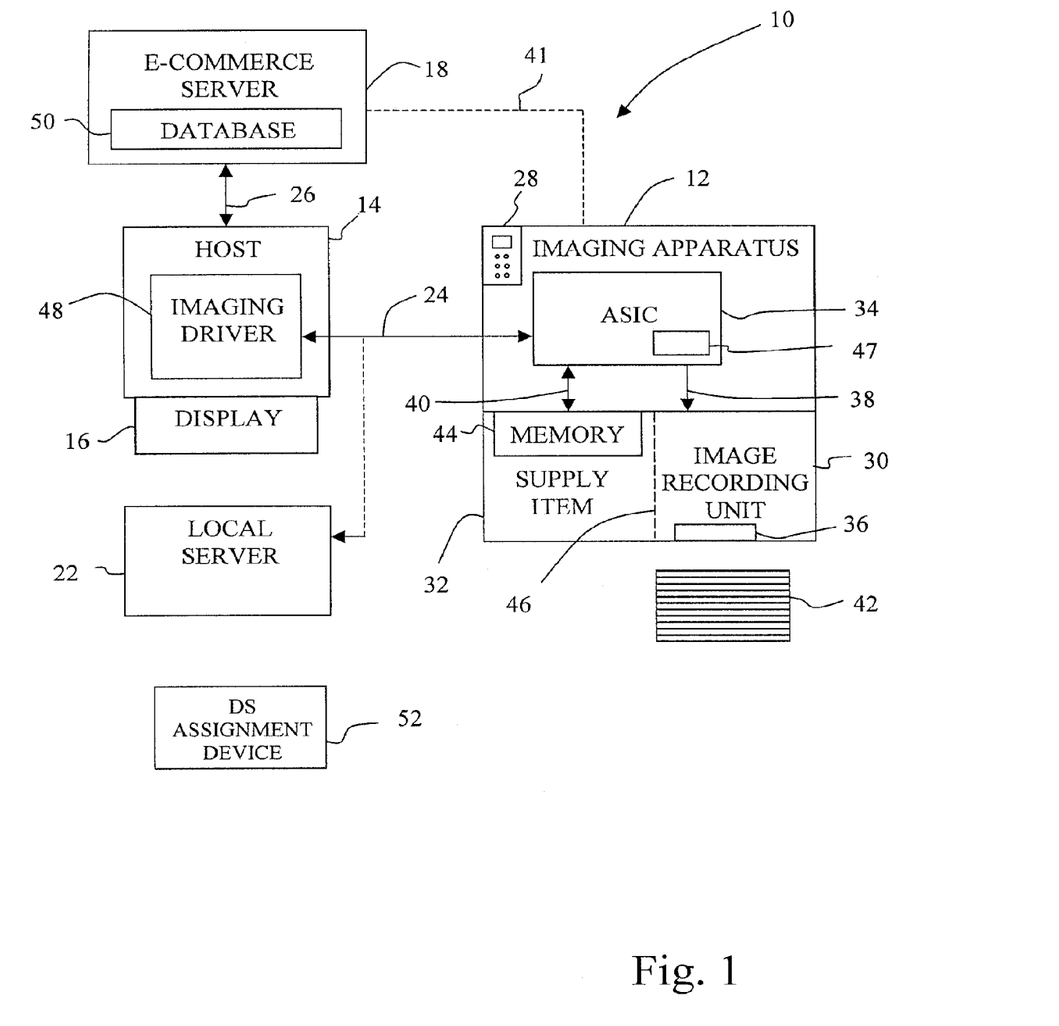
FIG. 1 is a diagrammatic depiction of a system used in association with the present invention.

Referring now to the drawings, and particularly to FIG. 1, there is shown a diagrammatic depiction of a system 10 used in association with the present invention. System 10 includes an imaging apparatus 12, a host 14 with a display 16, an e-commerce server 18 and, optionally, a local server 22. Imaging apparatus 12 communicates with host 14 via a communications link 24. Also, in embodiments that include local server 22, local server 22 communicates with each of imaging apparatus 12 and host 14 via communications link 24, with the aid of the extension of communications link 24 depicted by a dashed line. E-commerce server 18 communicates with host 14 via a communications link 26.

Imaging apparatus 12 may include, for example, a user interface 28, an image recording unit 30, a supply item 32 and an Application Specific Integrated Circuit (ASIC) 34. The ASIC 34 communicates with image recording unit 30 via a communications link 38. The ASIC 34 communicates with supply item 32 via a communications link 40. Imaging apparatus 12 can be, for example, an ink jet printer and/or copier, or an electrophotographic printer and/or copier.

It is further contemplated that imaging apparatus 12 may be a stand-alone multifunction imaging device that is not attached to host 14, e-commerce server 18, or local server 22. However, the stand-alone multifunction imaging device may facilitate the present invention as described herein with customer interaction, if any, via user interface 28. The stand-alone multifunction imaging device includes connectivity and processing capability sufficient to implement the various methods of the invention. In some implementations, however, e-commerce server 18 may communicate directly with the stand-alone multifunction imaging device via a communication link 41, such as for example, a telephone line connection.

In the context of the examples for imaging apparatus 12 given above, image recording unit 30 can be, for example, an ink jet printhead unit or an electrophotographic printing unit, and includes an imaging head 36 used for forming an image on a substrate 42, such as a sheet of print media or a photoconductive member. For convenience, each type of substrate 42 may be referred to by the element number 42, for example, print media 42.

Supply item 32 can be, for example, an ink supply tank, an ink jet cartridge, a toner tank, or an electrophotographic process (EP) cartridge, each of which containing a supply of an imaging substance, such as for example ink or toner, that is consumed during an imaging process. Imaging apparatus 12 uses the imaging substance contained in supply item 32 to form an image on print media 42. Print media 42 can be, for example, sheets of paper, fabric or transparencies.

Those skilled in the art will recognize that image recording unit 30 and supply item 32 may be formed as individual discrete units, or may be combined in an integral unit, these options being depicted by dashed line 46.

Preferably, supply item 32 has mounted thereto a memory 44 for storing information relating to supply item 32, such as for example, a supply item identification number, a value representing a digital signature (DS), a value representing an amount of usage of supply item 32, and a value representing time. For example, thirty-two or more bits in memory 44 may be reserved for the supply item identification number, which may be set by the manufacturer; eighteen or more bits in memory 44 may be reserved for the supply item digital signature; eight or more bits may be used as a usage gauge to maintain a record of usage of supply item 32 with each bit representing a level of depletion of imaging substance from supply item 32; and seven or more time tracking bits may be used to represent time, such as for example, the amount of time since supply item 32 was first installed in imaging apparatus 12. By attaching memory 44 to supply item 32, in essence, information stored in memory 44 associated with supply item 32 can travel with supply item 32 from one imaging apparatus to another.

The digital signature for supply item 32 is generated by combining the identification number with a digital key using a predefined algorithm. The digital key is used for encryption and decryption of digital information. The digital key, digital signature and identification number, and optionally other information, are used to verify the authenticity of supply item 32. The algorithm by which the digital signature is generated is not critical to the present invention, and many prior art methods may be adapted for use with the present invention. For example, it is contemplated that the digital signature could be created using a single secret key approach, or could be generated using a public key/private key approach. In a simple approach, for example, the digital signature could be generated by simply logically XORing the identification number with the digital key.

In implementations where supply item 32 is subject to a usage license, an initial supply amount of imaging substance contained in supply item 32 may be greater than the licensed amount of the imaging substance. For example, the initial supply amount of the imaging substance contained in supply item 32 can be, for example, at least two times greater than the original licensed amount. It is important to note, however, that while the initial amount of imaging substance supplied with imaging apparatus 12 and/or supply item 32 is more than sufficient to accommodate one or more license renewals, the customer has been required to pay only for the licensed amount at the time of the original purchase.

ASIC 34 includes an embedded processor and associated memory for executing program instructions to facilitate printing, and circuitry to facilitate communication with external devices, such as host 14 and e-commerce server 18. In addition, ASIC 34 may include an encryption key module 47, implemented as firmware or alternatively as hardware, for storing the digital key and an associated encryption/decryption algorithm, and in turn execute program steps associated with the encryption/decryption algorithm to encrypt or decrypt information using the digital key. Alternatively, it is contemplated that the encryption key module 47 may be located elsewhere, such as for example, on the silicon containing supply item memory 44, at some other location in imaging apparatus 12, located in an imaging driver 48 of host 14, or located in local server 22. The decision where to locate encryption key module 47 may be based on, for example, on the particular use of system 10, whether a usage license travels with imaging apparatus 12 or with supply item 32, a desire to provide heightened security against physical tampering, and/or, a desire to provide heightened security against unauthorized programming access, such as by hackers.

Host 14 may be, for example, a personal computer including a display device 16, an input device (e.g., keyboard), a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 48 for imaging apparatus 12. Imaging driver 48 is in communication with ASIC 34 of imaging apparatus 12 via communications link 24. The imaging driver 48 serves to facilitate communications between imaging apparatus 12 and e-commerce server 18. In addition, the imaging driver 48 serves in the traditional role of providing formatted print data to imaging apparatus 12.

E-commerce server 18 may be operated by a manufacturer, such as by the manufacturer of imaging apparatus 12 and/or supply item 32. E-commerce server 18 provides, and has access to, a database 50 for facilitating e-commerce transactions via the Internet or telephone line, and for storing information relating to the e-commerce transactions and information relating to the imaging apparatus and/or supply items associated with such e-commerce transactions. Thus, e-commerce server 18 may be used in communicating with a customer and/or a connected device, such as an imaging apparatus or a supply item.

In some methods of the invention, however, e-commerce server 18 may be used as a standard commerce server for facilitating traditional commerce transactions without necessarily resorting to Internet or phone line connections.

For some methods of the invention, database 50 includes capacity for storing the identification number for each imaging apparatus and/or each supply item to which the transaction(s) may be directed, as well as a set of digital keys, with each identification number having associated therewith at least one digital key. Further, e-commerce server 18 can generate a digital signature in the manner described above for a particular supply item, or for a particular imaging apparatus.

Communications link 24 may be established by a direct cable or a wireless connection, or by a network connection such as for example an Ethernet local area network (LAN). Communications links 38 and 40 may be established by using standard electrical cabling or bus structures, or by wireless connections.

Communications link 26 is preferably established by an Internet connection, or via a wide area network (WAN). Alternatively, however, communications link 26 graphically represents a communication by a customer who physically visits the premises of e-commerce server 18, or a telephone link to e-commerce server 18.

Figure 2A:
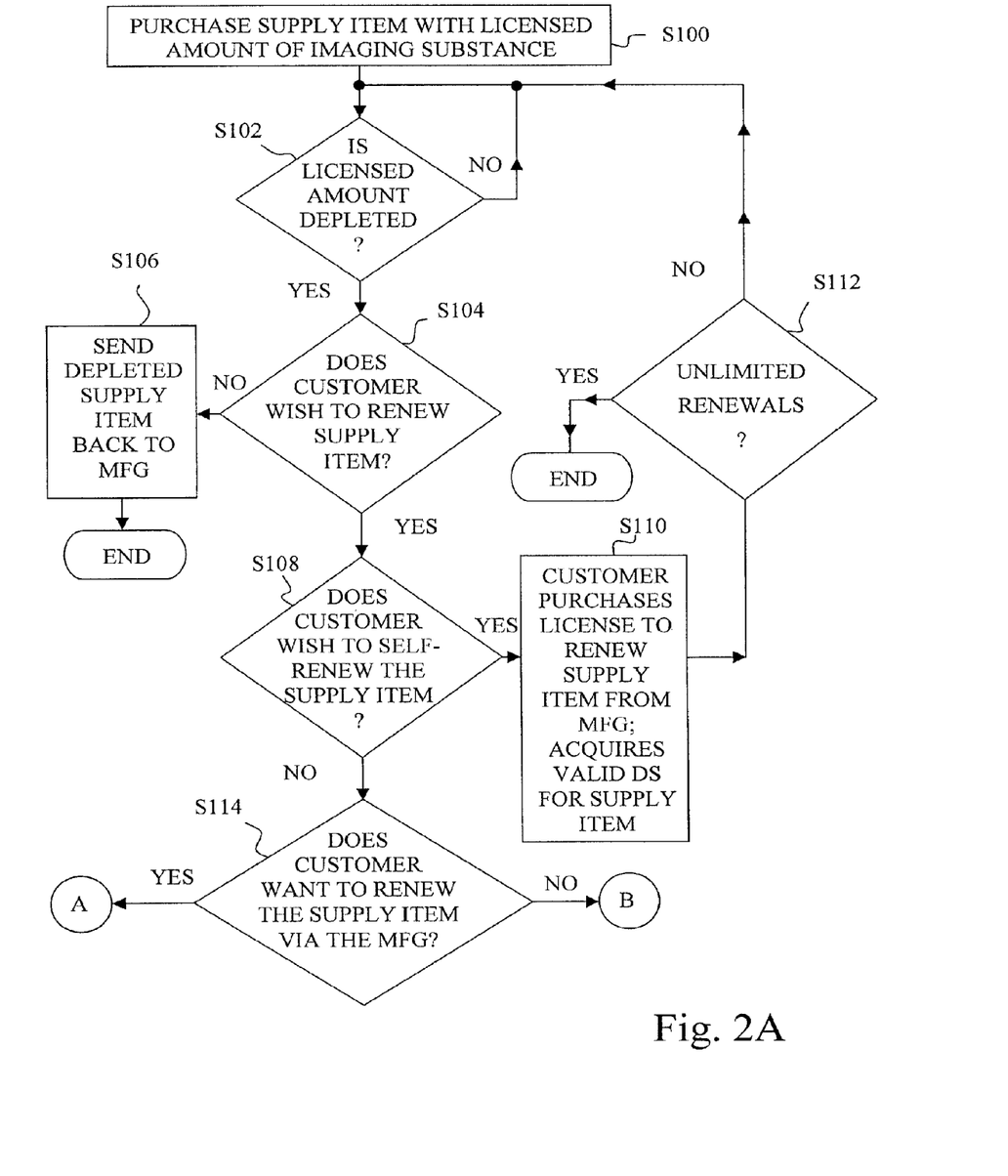
FIGS. 2A and 2B are a flowchart of one method of the invention for licensing extra functionality after an initial transaction.
Figure 2B:
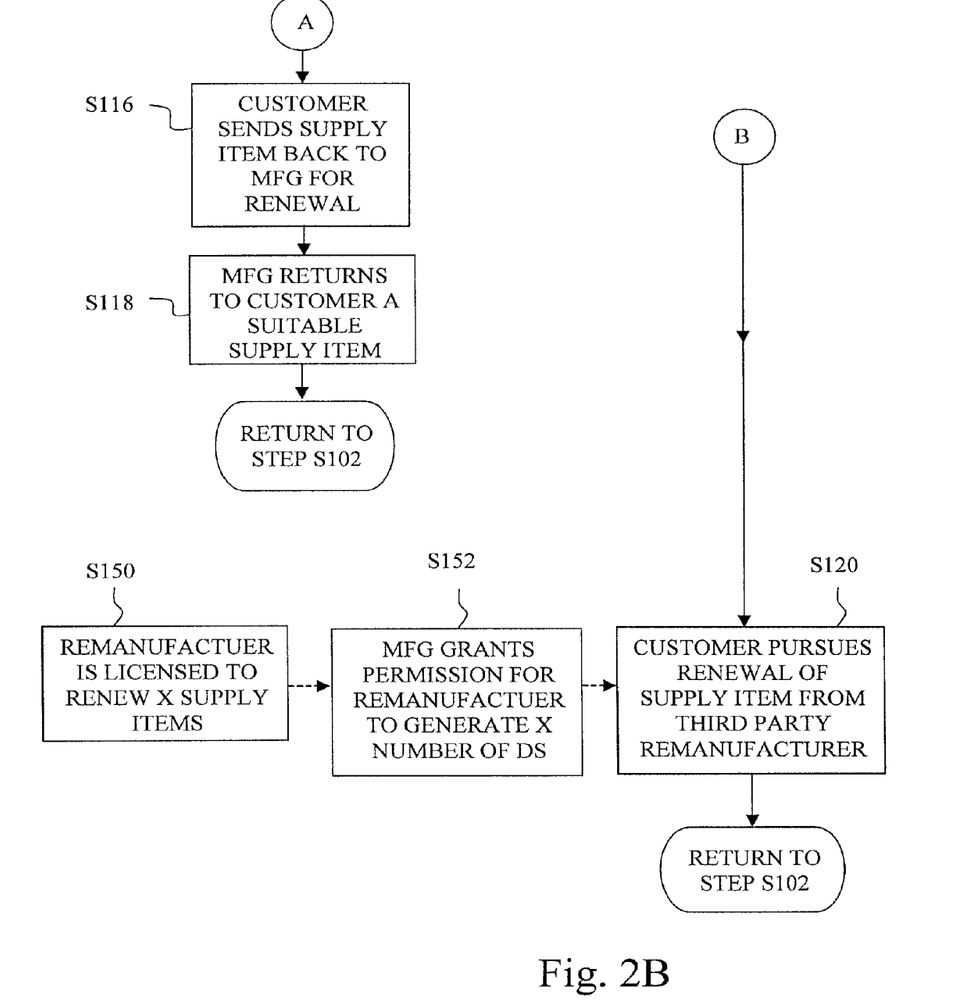

Turning now to FIGS. 2A and 2B there is shown one method of the invention for licensing extra functionality after an initial transaction.

Step S100 represents an initial transaction, wherein a customer has acquired supply item 32 with an initial amount of imaging substance. Supply item 32 could be, for example, an ink jet printhead cartridge with an initial amount of ink that was licensed for use with the ink jet printhead cartridge.

At step S102, it is determined whether the initial licensed amount of imaging substance has been depleted. Such a determination can be made based on a variety of factors, such as by counting the number of imaging pixels generated, the number of pages printed, or time of usage. Based on the usage criteria selected, individual bits of the usage gauge in memory 44 are set as the amount of usage increases beyond certain predetermined thresholds. For example, during usage of supply item 32, ASIC 34 may write information to the usage gauge in memory 44 when each threshold level is reached based on an estimate or measurement of the amount of imaging substance consumed from supply item 32. For example, if eight bits are used as the usage gauge, a bit could be set at approximately each twelve percent of depletion of imaging substance contained in supply item 32. When the eighth bit is set, it is deemed that the imaging substance in supply item 32 has been depleted to a point where only a very limited amount of continued printing can be performed.

If, at step S102, the determination is NO, then the process remains in the monitoring loop of step S102.

If, at step S102, the determination is YES, then the process proceeds to step S104.

At step S104, ASIC 34 informs imaging driver 48 of the depletion of imaging substance in supply item 32. In turn, imaging driver 48 causes a message to be displayed on display 16 that informs the customer that supply item 32 is depleted, or is close to being depleted, and queries whether the customer would like to renew the supply item. Display 16 may further display a list of possible supply item renewal options that are available to the customer, such as for example: self-renewal of the supply item, original manufacturer renewal of the supply item, or third party remanufacturer renewal of the supply item.

If, at step S104, the customer does not desire to renew supply item 32, then at step S106 a message is displayed on display 16 asking the customer to return the spent supply item 32 to the manufacturer for recycling or for environmentally friendly disposal. To facilitate such a return, the manufacturer may supply a prepaid shipping container to the customer at the time of the initial purchase of supply item 32.

If, at step S104, the customer desires to renew the supply item, a determination is then made by the customer as to how the renewal of supply item 32 will take place.

At step S108, it is determined whether the customer wants to self-renew the supply item, such as for example, through the use of a refill kit available from a third party and the acquisition of a new license from the manufacturer. Alternatively, such self-renewal may require only a new license if supply item 32 originally included sufficient imaging substance to accommodate multiple licenses.

If, at step S108, the determination is YES, the process proceeds to step S110.

At step S110, the customer contacts the manufacturer to purchase a license to allow the customer to self-renew the supply item. Upon purchase of the license, the manufacturer supplies to the customer a new digital signature (DS) to be stored in memory 44 of supply item 32 that will enable continued use of supply item 32.

In one embodiment, the customer may contact the manufacturer via host 14 or user interface 28, and e-commerce server 18, to initiate the license purchase, and upon payment, will then receive a download of a valid, e.g., new, digital signature from e-commerce server 18. The details of step S110 are more fully described below with respect to FIG. 3.

Other possibilities for providing the new digital signature to the customer include procurement via telephone or mail, wherein the digital signature code is supplied to the customer for manual installation, or procurement via an authorized outlet store.

At step S112, it is contemplated that the customer may want to purchase a lifetime license for unlimited renewals, or may choose to purchase a single renewal license. If a lifetime license is purchased for that particular supply item, then the customer is able to renew the cartridge as many times as practical, limited only by the lifetime of the supply item components. If, however, the customer chooses to purchase the single renewal license, then the process returns to step S102.

If, at step S108, the customer chooses not to self-renew supply item 32, then the process proceeds to step S114, where it is determined whether the customer wants to renew supply item 32 via the supply item manufacturer.

If at step S114 the determination is YES, then the process proceeds to step S116 (FIG. 2B) for renewal via the manufacturer.

At step S116, the customer sends supply item 32 back to the manufacturer for renewal. Depending upon the renewal program, the renewal may be as simple as refilling supply item 32 with imaging substance and loading a new digital signature in memory 44 to make supply item 32 suitable for continued use. A more elaborate renewal, in the context of an ink jet printhead cartridge, for example, could include cleaning of the cartridge nozzle plate and a test of electrical components on supply item 32. Further, the renewal may be in the form of a replacement for supply item 32, so as to provide a suitable supply item to the customer as soon as possible.

At step S118, the manufacturer returns to the customer a suitable supply item 32, which as mentioned above, could be either the renewed original supply item 32 or a replacement for supply item 32.

The process then returns to step S102 wherein the renewed supply item is reinstalled in imaging apparatus 12, and monitoring of usage is reinitiated.

If, at step S114, the determination is NO, then the process proceeds to step S120 (FIG. 2B) for renewal via an authorized third party remanufacturer.

At step S120, the customer pursues renewal of supply item 32 via a third party remanufacturer. As shown by the steps to the left of step S120, the remanufacturer is authorized by the manufacturer at steps S150 and S152 to perform license renewal of supply item 32.

At step S150, the remanufacturer negotiates with the manufacturer to provide licensed renewals of a predetermined number X of supply items, such as supply item 32.

At step S152, the manufacturer grants permission to the remanufacturer to generate X number of valid digital signatures that are available for use with the number X of supply items. Accordingly, at step S120 the remanufacturer replenishes the imaging substance supply in supply item 32 and loads a new digital signature in supply item 32. The details of step S120 will be further described below with respect to FIG. 4.

The process then returns to step S102 wherein the renewed supply item is reinstalled in imaging apparatus 12, and monitoring of usage is reinitiated.

Figure 3:
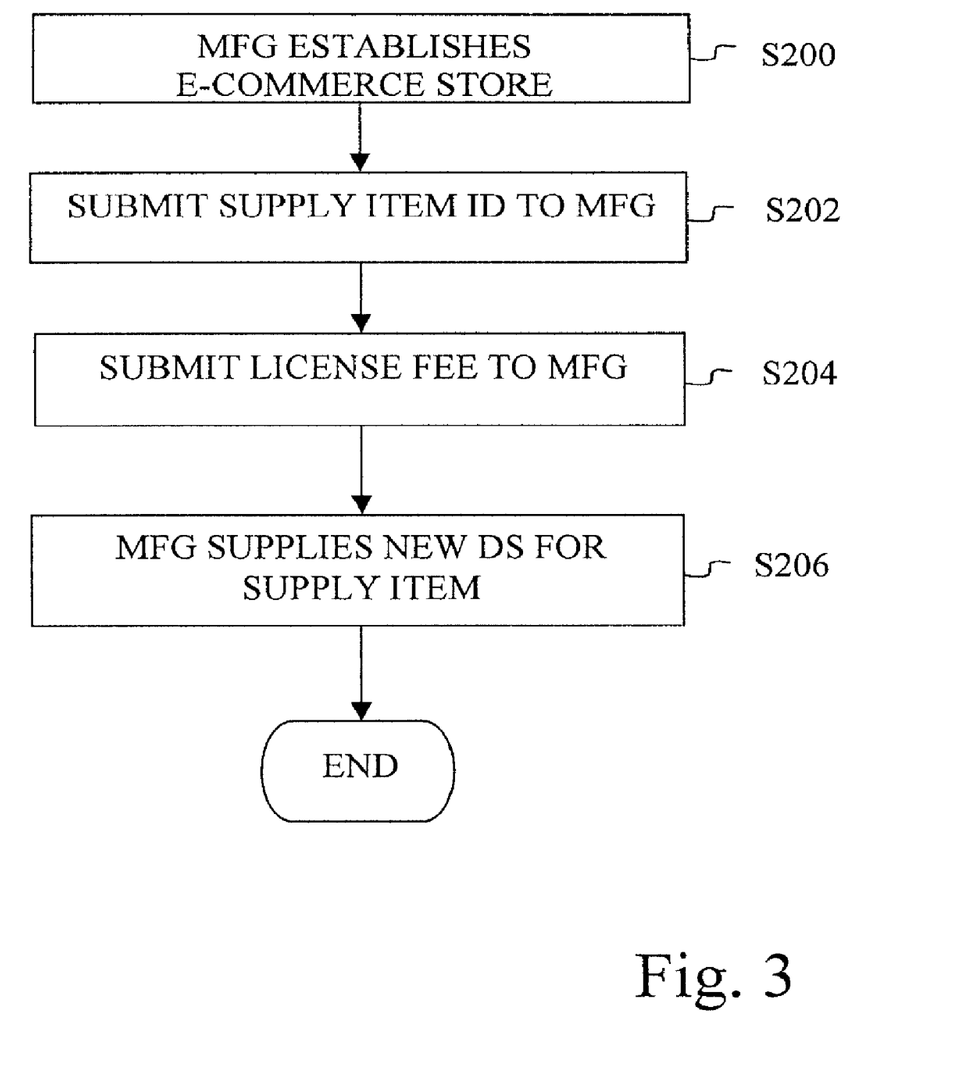
FIG. 3 is a flowchart of an e-commerce transaction involving a manufacturer and a customer which may occur when practicing the method of FIGS. 2A and 2B.

FIG. 3 shows a flowchart of an e-commerce transaction involving the manufacturer and the customer which may occur, for example, at step S110 described above with respect to FIG. 2A.

At step S200, the manufacturer has established an e-commerce store utilizing e-commerce server 18 to handle the e-commerce transactions. Referring to FIG. 1, the customer may communicate with e-commerce server 18 via host 14 and communications link 26, or directly from imaging apparatus 12 via user interface 28 and communications link 41. E-commerce server 18 is configured to generate a digital signature that is needed to renew supply item 32.

At step S202, communications are initiated between the customer and the manufacturer regarding the renewal of supply item 32. The customer then supplies to the manufacturer the predetermined information necessary to generate the digital signature. At a minimum, the predetermined information will include the identification number assigned to the supply item prior to its initial use. Other information that may be included could be the type of printhead, e.g., monochrome or color, the model number of the supply item, the lot number of the supply item, and/or the identification number of imaging apparatus 12. This predetermined information is compiled by ASIC 34 and then supplied to e-commerce server 18.

Once e-commerce server verifies the apparent authenticity of the request, then at step S204 e-commerce server 18 provides to the customer the payment options which may be available, e.g., through an existing account, credit card, debit card, etc., for paying for a license for the renewal of the supply item. The customer then submits the license fee to acquire a license to complete the renewal of the supply item.

At step S206, the manufacturer supplies via e-commerce server 18 the new digital signature for supply item 32. The digital signature is then processed by imaging apparatus 12 and stored in memory 44 of supply item 32. Associated with the digital signature in memory 44 is a new set of usage bits used in tracking usage of supply item 32. ASIC 34 verifies that the digital signature is proper for supply item 32 via the digital key stored in encryption key module 47. Once verified, supply item 32 is ready for continued use. If verification fails, the customer would be so advised via display 16 or user interface 28.

Figure 4:
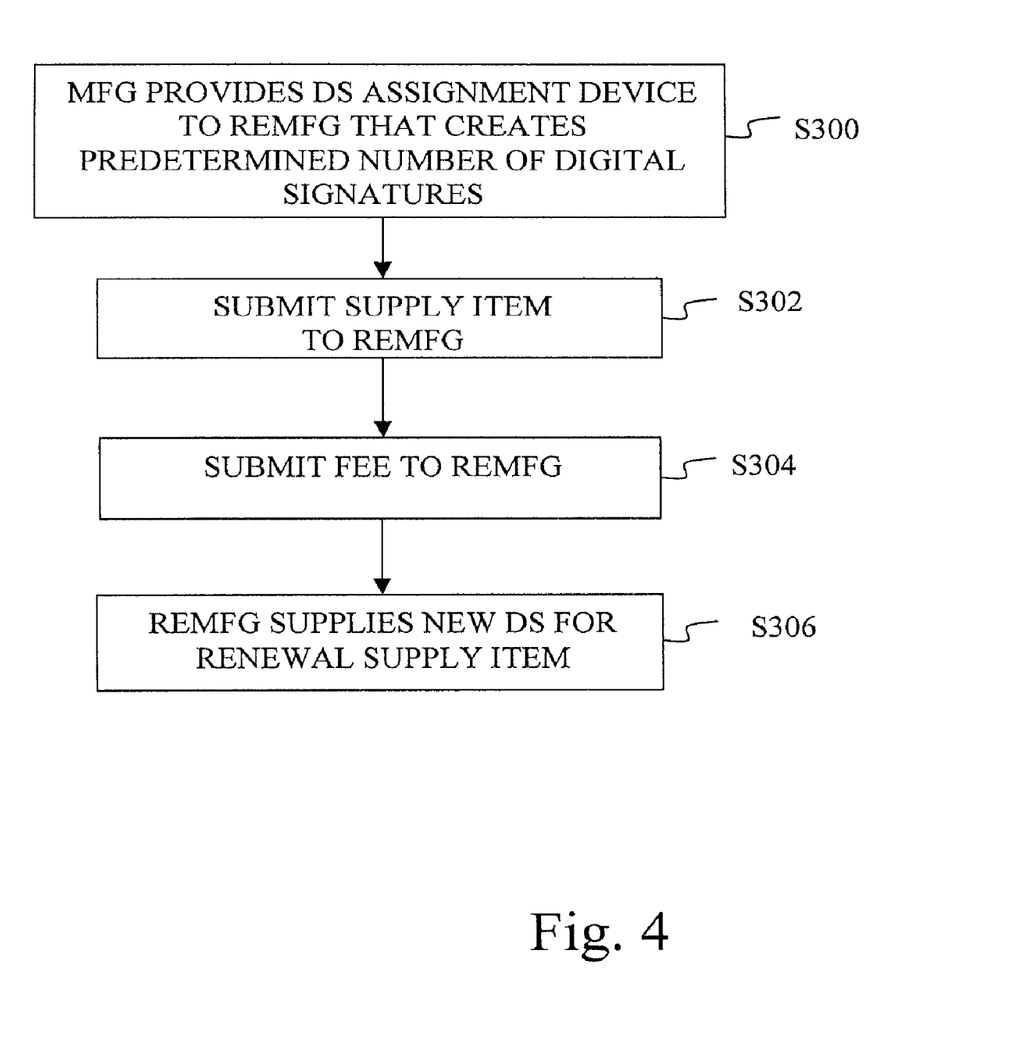
FIG. 4 is a flowchart of a commerce transaction involving an authorized remanufacturer and a customer which may occur when practicing the method of FIGS. 2A and 2B.

FIG. 4 shows a flowchart of a commerce transaction involving an authorized remanufacturer (see steps 150 and 152 of FIG. 2B) and the customer which may occur, for example, at step S120, as described above with respect to FIG. 2B.

At step S300, corresponding generally to steps S150 and 152 described above, the capability to create digital signatures is provided by the manufacturer to the remanufacturer via a digital signature (DS) assignment device 52 (see FIG. 1). DS assignment device 52 is capable of creating a predetermined number X of digital signatures, wherein the supply item is electrically coupled to DS assignment device 52 and a new digital signature would be generated. In exchange, the remanufacturer pays a license fee associated with the digital signatures. DS assignment device 52 includes a hardware circuit that is configured or programmed to create digital signatures in a manner essentially the same as that which occurs in e-commerce server 18, as more fully described above, and then writes the digital signature into memory 44. In particular, stored in DS assignment device 52 would be at least one digital key and a digital signature creation algorithm. For example, the digital signature would be created for supply item 32 by DS assignment device 52 using, at a minimum, the digital key and the identification number of supply item 32. Once DS assignment device 52 has created the predetermined number X of digital signatures, DS assignment device 52 can be recharged by the manufacturer for creating additional digital signatures.

At step S302 supply item 32, including its identification number, is submitted to the remanufacturer to receive a new digital signature and, if necessary, for replenishment with imaging substance. The remanufacturer may receive supply item 32 directly from the customer, or alternatively, the remanufacturer may receive supply item 32 from a collection source.

At step S304, the customer then submits a fee, such as for example a license fee and/or a remanufacture fee, or other fee, to the remanufacturer.

At step S306, the remanufacturer supplies the new digital signature for supply item 32 by writing the digital signature to memory 44 of supply item 32 via DS assignment device 52.

Figure 5:
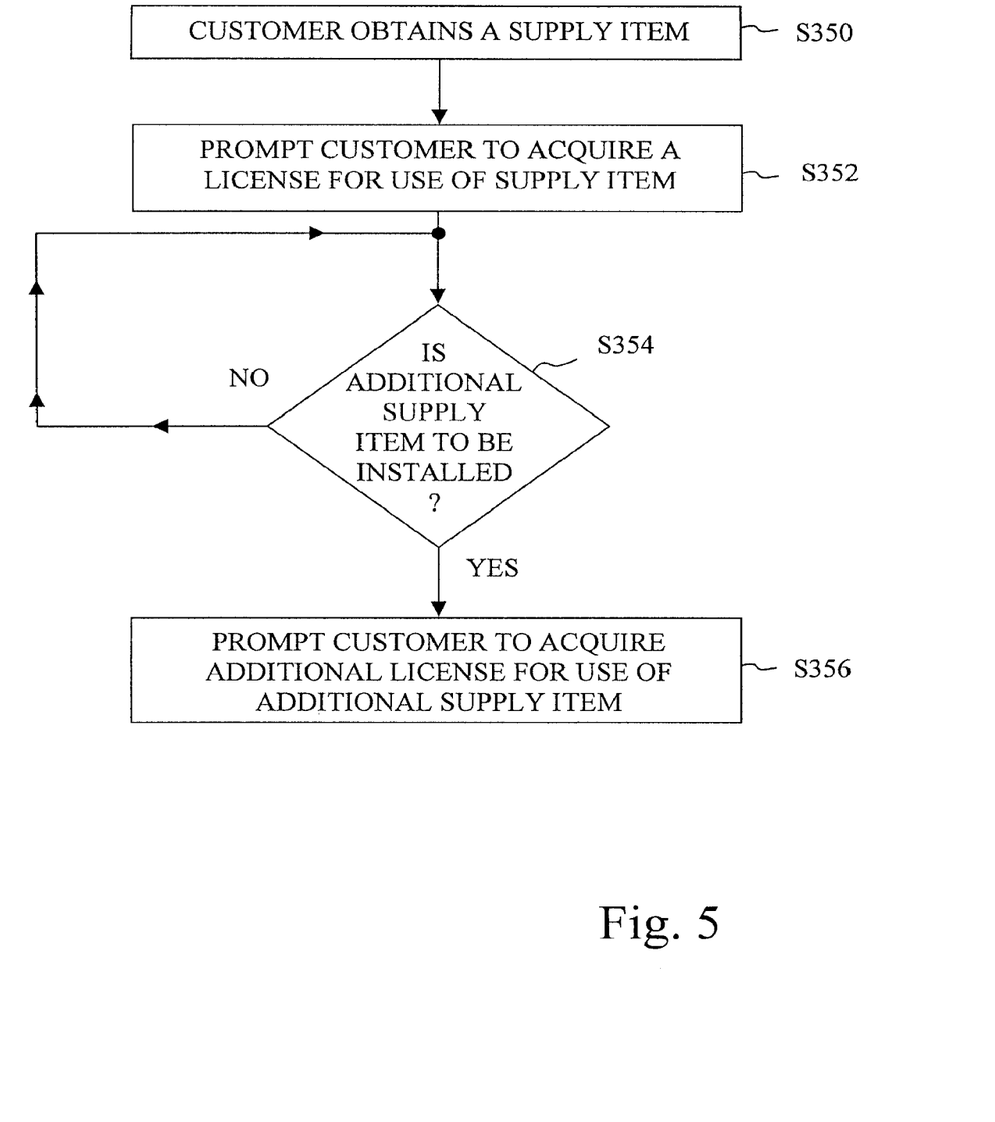
FIG. 5 is a flowchart of another method that licenses functionality after an initial transaction.

FIG. 5 is a flowchart of a method for licensing after an initial transaction of a customer obtaining a current supply item, such as supply item 32.

At step S350, the customer obtains a supply item, such as supply item 32. The customer may have obtained supply item 32, for example, via a purchase, or a promotional sponsored by the supply item manufacturer. Supply item 32 may be obtained as an individual unit, or may be one of a plurality of supply items in a multi-pack.

At step S352, the customer is prompted to acquire a license for use of supply item 32. The prompting may occur, for example, upon installation of supply item 32 in imaging apparatus 12, via a message generated at display 16 or user interface 28. The actual acquisition of the license may occur, for example, through an e-commerce transaction substantially as described above with respect to FIG. 3 (steps S202-S206), with the exception that in this case supply item 32 may be either new or renewed, but in any event, supply item 32 is in need of a license to enable use. In summary, the acquisition includes the steps of establishing a communications link between an e-commerce server and the customer; initiating communications between the customer and the e-commerce server; the customer supplying to the e-commerce server predetermined information necessary to generate a digital signature for supply item 32; the customer submitting a license fee to acquire the usage license for supply item 32; and the e-commerce server supplying the digital signature for supply item 32.

At step S354, it is determined whether an additional supply item is to be installed. The additional supply item may be another supply item of the multi-pack, or may simply be another supply item separately obtained. It may be that the customer wants to install the additional supply item concurrently with supply item 32 in imaging apparatus 12. Alternatively, the additional supply item may be installed in a different imaging apparatus from that of supply item 32.

As a further alternative, it may be that the additional supply item is to replace supply item 32 if the licensed imaging substance in supply item 32 is depleted, wherein this determination may be made substantially as described above with respect to step S102 of FIG. 2A. This depletion determination may be made, for example, based on a counting of a number of imaging pixels generated, counting a number of pages printed, or determining a time of usage.

If, at step S354, the determination is NO, the process remains in the monitoring loop of step S354.

If, at step S354, the determination is YES, the process proceeds to step S356.

At step S356, the customer is prompted to acquire an additional license for use of the additional supply item. Depending on the circumstances, as in the examples given in discussing step S354 above, the additional license may be held concurrently with the license for supply item 32, in the event that the license for supply item 32 has not expired due to depletion of the licensed amount of imaging substance in supply item 32. Alternatively, the additional license may be a replacement for the license for supply item 32, in the event that the license for supply item 32 has expired due to depletion of the licensed amount of imaging substance in supply item 32. The prompting and acquisition of the additional license may be completed, for example, substantially as described above in step S352.

Figure 6:
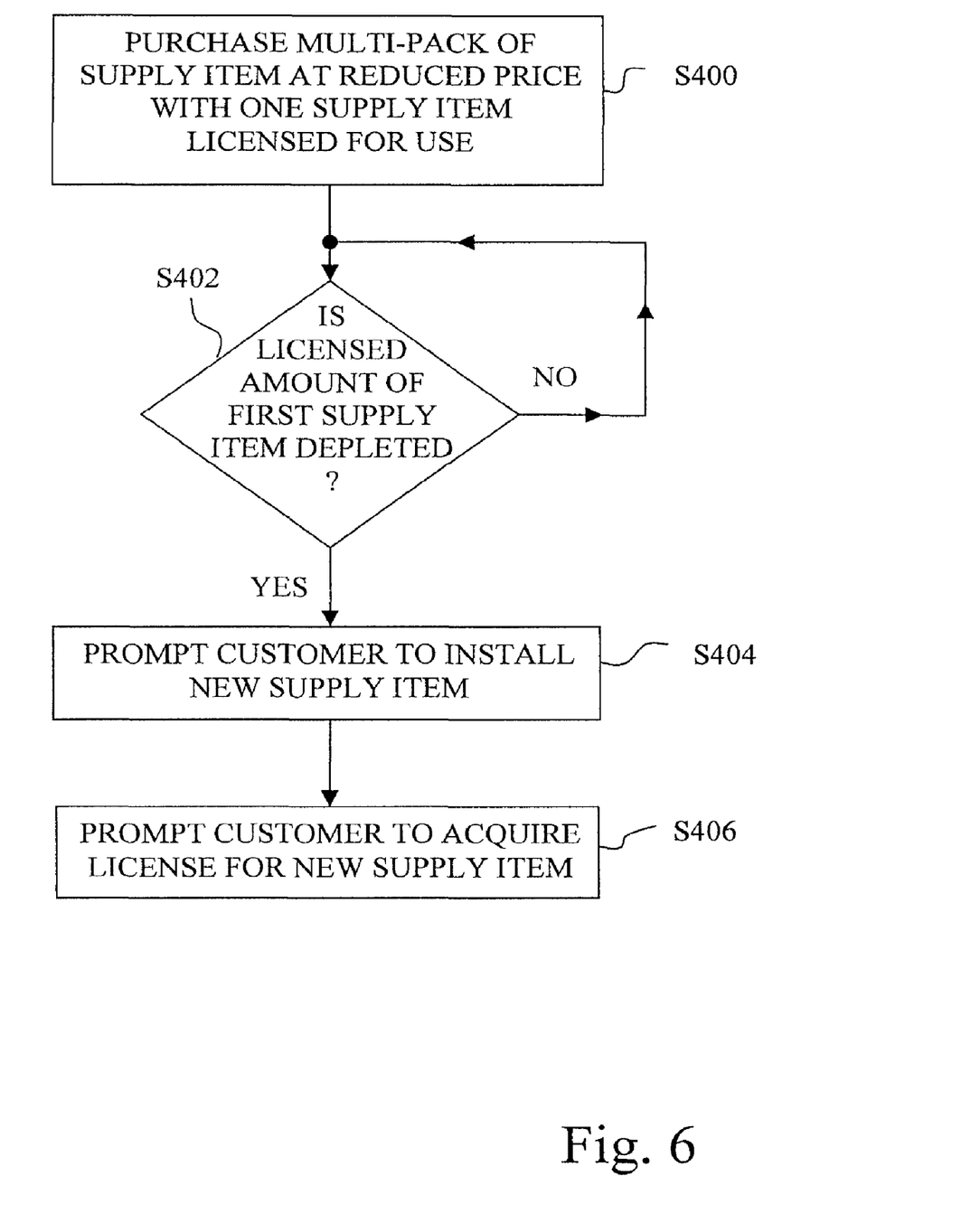
FIG. 6 is a flowchart of another method for licensing extra functionality after an initial transaction.

FIG. 6 is a flowchart of another method for licensing extra functionality after an initial transaction.

At step S400, the customer purchases a multi-pack of supply items, along with a license to use one of the supply items. This approach provides a convenience to the customer of having a physical replacement for supply item 32 on hand, while only having the initial expense associated with one supply item.

At step S402, it is determined whether the imaging substance in the first supply item has been depleted. Such a determination can be made based on a variety of factors, such as by counting the number of imaging pixels generated, the number of pages printed, or time of usage. Based on the usage criteria selected, individual bits of the usage gauge in memory 44 are set as the amount of usage increases beyond certain predetermined thresholds. For example, during usage of supply item 32, ASIC 34 may write information to the usage gauge in memory 44 when each threshold level is reached based on an estimate or measurement of the amount of imaging substance consumed from supply item 32. For example, if eight bits are used as the usage gauge, a bit could be set at approximately each twelve percent of depletion of imaging substance contained in supply item 32. When the eighth bit is set, it is deemed that the imaging substance in supply item 32 has been depleted to a point where only a very limited amount of continued printing can be performed.

If, at step S402, the determination is NO, then the process remains in the monitoring loop of step S402.

If, at step S402, it is determined that the first supply item is depleted, the process proceeds to step S404.

At step S404, the customer is prompted via host 14 or user interface 28 to install a new supply item from the multi-pack.

At step S406, the customer is prompted to acquire a license for the newly installed supply item, such as for example, through an e-commerce transaction substantially as described above with respect to FIG. 3 (steps S202-S206).

Figure 7:
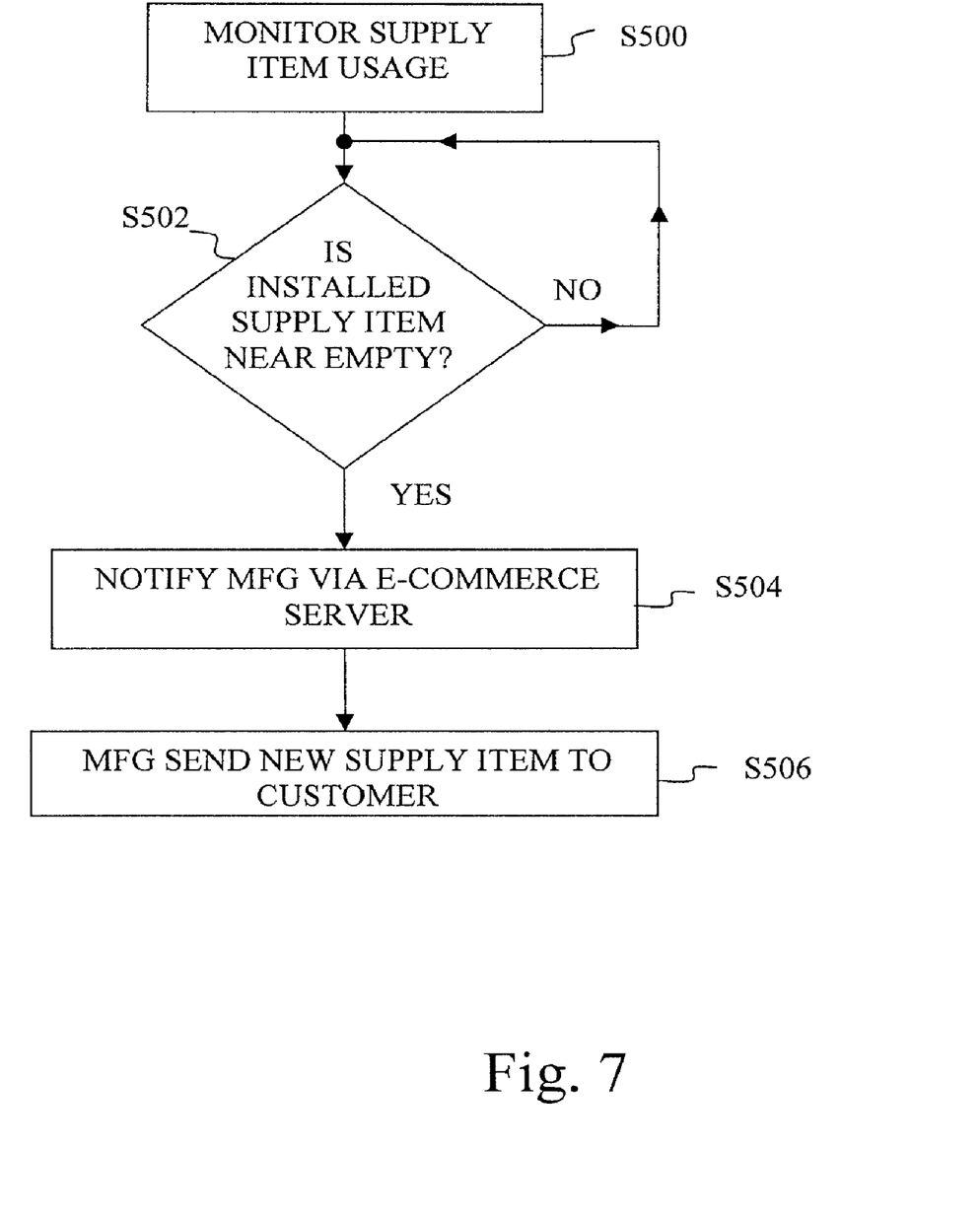
FIG. 7 is a flowchart of yet another method for licensing extra functionality after an initial transaction.

FIG. 7 is a flowchart of another method for licensing extra functionality after an initial transaction.

At step S500, the usage of supply item 32 is monitored. Such monitoring can be performed based on a variety of factors, such as by counting the number of imaging pixels generated, the number of pages printed, or time of usage. Based on the usage criteria selected, individual bits of the usage gauge in memory 44 are set as the amount of usage increases beyond certain predetermined thresholds. For example, during usage of supply item 32, ASIC 34 may write information to the usage gauge in memory 44 when each threshold level is reached based on an estimate or measurement of the amount of imaging substance consumed from supply item 32. For example, if eight bits are used as the usage gauge, a bit could be set at approximately each twelve percent of depletion of imaging substance contained in supply item 32, with the seventh bit representing the "near empty" condition.

At step S502, it is determined whether the supply item is near empty based on the status of the usage gauge in memory 44 of supply item 32, which may be performed by ASIC 34. In the example described above, when it is detected that the seventh bit is set, it is deemed that the imaging substance in supply item 32 has been depleted to a point where supply item 32 is near empty.

If, at step S502, the determination is NO, then the process remains in the monitoring loop of step S502.

When the determination at step S502 is YES, the process proceeds to step S504 wherein the manufacturer is notified that the customer has nearly exhausted the available imaging supply in supply item 32. Such notification can occur automatically when ASIC 34 senses that the supply item is "near empty" by initiating communication with e-commerce server 18. Communications with e-commerce server can be via host 14 and communications link 26, or alternatively, via imaging apparatus 12 and communications link 41.

Alternatively, such notification can occur interactively, wherein ASIC 34 informs imaging driver 48 of the depletion of imaging substance in supply item 32. In turn, imaging driver 48 causes a message to be displayed on display 16 that informs the customer that supply item 32 is near empty, and provides information on how to contact the manufacturer to receive a new supply item. For convenience, the contact may be made via host 14 and e-commerce server 18.

At step S506, the manufacturer sends a new supply item to the customer. Accompanying the new supply item can be a request asking the customer to return the spent supply item 32 to the manufacturer for recycling or for environmentally friendly disposal. To facilitate such a return, the manufacturer may supply a prepaid shipping container to the customer with the new supply item.

Figure 8:
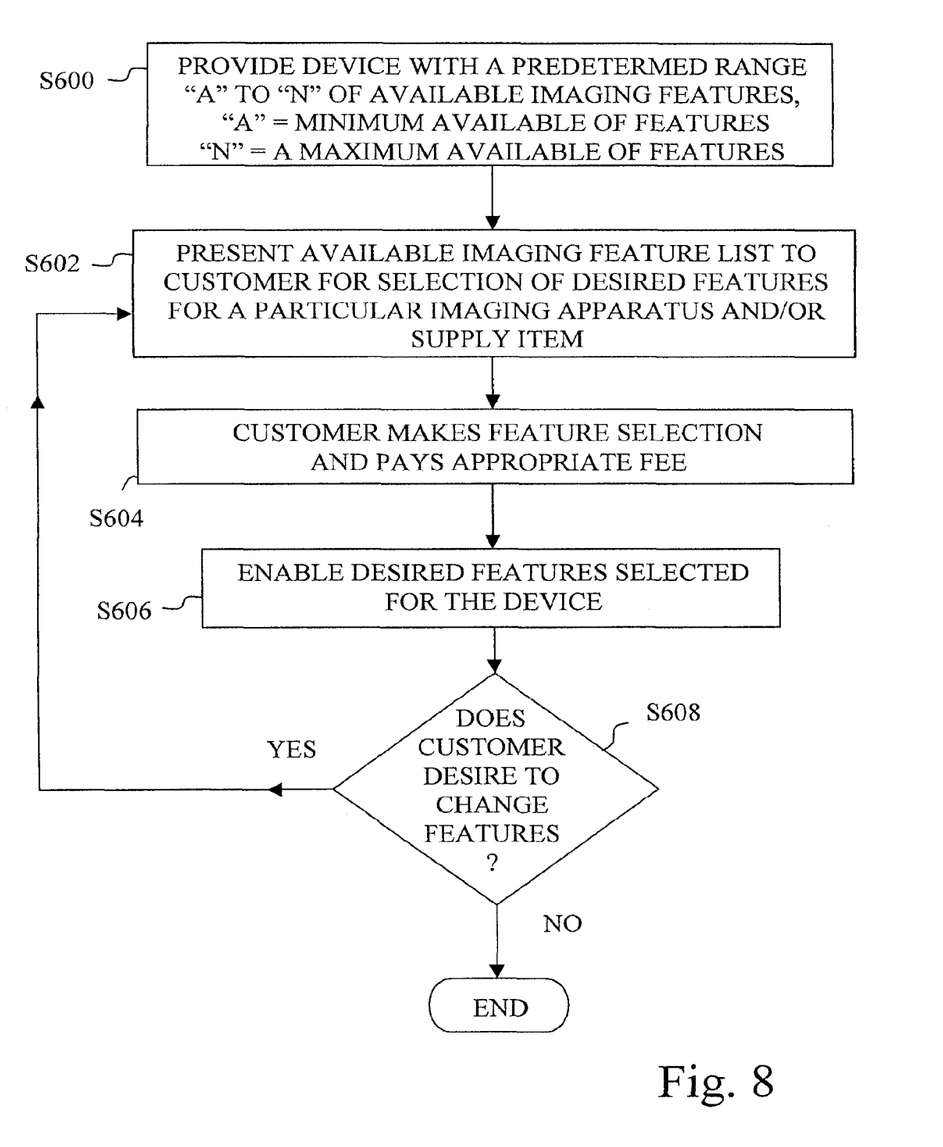
FIG. 8 is a flowchart of still another method for licensing extra functionality after an initial transaction which may be applied to either, or both, of an imaging apparatus and a supply item.

FIG. 8 is a flowchart of another method for licensing extra functionality after an initial transaction which may be applied to a device, such as for example imaging apparatus 12 and/or supply item 32. The concept of this method is to provide to the customer the ability to customize imaging apparatus 12 and/or supply item 32 based on the customer's imaging needs, while only having to purchase the features that are needed or desired by the customer.

At step S600, the manufacturer makes available a device with a predetermined range "A" to "N" of imaging features. The variable "A" represents the minimum available features and the variable "N" represents the maximum available features. The available features may include, for example, a variety of ranges of imaging qualities and resolutions, e.g., 4800 dpi, 2400 dpi, etc.; imaging speeds; paper handling modes, e.g., simplex, duplex, dual tray; print modes, e.g., photo quality, ink saver, edge-to-edge imaging; networking options; job finishing options; auto media sensing; auto printhead alignment; and photo card reader availability, to name a few. For an all-in-one apparatus, such features may further include scan resolution; document scaling; image filtering, e.g., smoothing and sharpening; stand-alone copying; stand-alone faxing; and data compression support, to name a few.

In addition, as a further option, the purchase or licensing of certain imaging apparatus features may permit the use of lower cost supply items.

Further, the use of a particular supply item may require the inclusion of certain necessary combinations of features in an imaging apparatus. For example, the use of a photo cartridge as supply item 32 might require the purchase or licensing of the photo printing features in imaging apparatus 12.

A minimum features configuration might only include, for example, monochrome printing at resolutions of 600 dpi or less, whereas the maximum feature configuration would include all features available for a particular imaging apparatus, supply item, or imaging apparatus/supply item combination. Each of the features, or combinations of features, will be provided to a customer as options available for purchase or license.

At step S602, an available feature list is provided to the customer for selection of desired features for a particular imaging apparatus and/or supply item. If the device is an imaging apparatus, the list may be resident, for example, in ASIC 34, imaging driver 48 or e-commerce server 18, or other suitable location. If the device is a supply item, then the list may be resident in memory 44, or alternatively in ASIC 34, imaging driver 48 or e-commerce server 18. In either case, the list is retrieved for display on display 16 and/or user interface 28. The list can be as simple as an electronic checklist of individual features, or may include a more comprehensive grouping of features which are known to work well together, and which may be selected as a group. Pricing for the individual features or groups of features would also be displayed.

As a marketing tool, a manufacturer may promote certain features as a group, or may also provide for free or at a reduced fee certain imaging features for a trial period, e.g., higher print speed, enhanced resolution imaging, etc., wherein after the trial period those features would no longer be available unless the customer desires to keep those features, and the customer submits the appropriate fee.

At step S604, the customer makes the desired selections by making appropriate entries at host 14 or user interface 28 using, for example, a web browser, which in turn then transmits the customer's desired selections, along with appropriate identification data, to e-commerce server 18 for processing. In addition, arrangement for payment of the appropriate fee for the selected features is made, e.g., credit card payment, or charges to a previously established revolving credit account.

At step S606, the desired features selected for the device are enabled. The enabling may occur, for example, via e-commerce server 18 which responds to the customer's selections with a digital signature that is associated with the device's identification number, and which includes the code needed to enable the selected features for use.

At this point, the particular imaging apparatus and/or supply item is ready for use. However, it may be that the customer's imaging needs or desires change from that represented by the features that were originally selected. If so, the process proceeds to step S608.

At step S608, it is determined whether the customer desires to change the previously selected features. If NO, the process ends. If YES, then the process returns to step S602 at which time the feature list is again displayed on display 16 and/or user interface 28. This gives the customer the ability to upgrade to a device, e.g., imaging apparatus and/or supply item, with more features, without having to purchase an entirely new device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of performing an e-commerce transaction through a communications link between an e-commerce server and a customer, comprising the steps of:

initiating communications between said customer and said e-commerce server regarding a renewal of a supply item, said supply item containing an ink or toner imaging substance, wherein said imaging substance is used to form a visible image on a print media in an imaging device;

said customer supplying to said e-commerce server predetermined information necessary to generate a digital signature for said supply item;

said customer submitting a license fee to acquire a license to complete said renewal of said supply item; and said e-commerce server supplying said digital signature for said supply item.

2. The method of claim 1, wherein said predetermined information includes an identification number assigned to said supply item prior to an initial use of said supply item.

3. The method of claim 1, further comprising the steps of processing said digital signature by an imaging apparatus receiving said supply item and storing in a memory of said supply item said digital signature.

4. The method of claim 1, further comprising the step of associating with said digital signature a set of usage bits used in tracking usage of said supply item.

5. The method of claim 1, wherein said digital signature is verified as proper for said supply item via a digital key.

6. A method for performing a commerce transaction involving a remanufacturer and a customer, comprising the steps of:

said remanufacturer securing a capability to create digital signatures for supply items;

submitting a supply item to said remanufacturer to receive a new digital signature, said supply item containing an ink or toner imaging substance, wherein said imaging substance is used to form a visible image on a print media in an imaging device;

said customer submitting a fee to said remanufacturer; and said remanufacturer supplying from a computing device a digital signature for said supply item.

7. The method of claim 6, wherein said digital signature is written to a memory of said supply item.

8. The method of claim 6, wherein said digital signature is written to a memory of said supply item via a digital signature assignment device.

9. The method of claim 8, wherein said digital signature assignment device is capable of creating a predetermined number of digital signatures.

10. The method of claim 9, wherein said predetermined number is set by a manufacturer of said supply item.

11. The method of claim 9, wherein digital signature assignment device includes at least one digital key associated with said supply item.

12. A method for licensing extra functionality after an initial transaction, comprising the steps of:

providing an e-commerce server for communicating with a customer;

monitoring usage of a first supply item, said first supply item containing an ink or toner imaging substance, wherein said imaging substance is used to form a visible image on a print media in an imaging apparatus;

determining whether said ink or toner of the first supply item is near empty;

notifying a manufacturer that said first supply item is near empty by initiating a communication with said e-commerce server; and said manufacturer responding to said notifying by sending a new supply item to said customer.

13. The method of claim 12, further comprising the step of requesting said customer to return the first supply item to said manufacture for one of recycling and environmentally friendly disposal.

14. The method of claim 12, wherein said new supply item is received with a usage license.

15. The method of claim 12, wherein said customer is prompted to acquire a usage license upon loading said new supply item in an imaging apparatus.

* * * * *